(12) United States Patent  (10) Patent No.: US 8,333,031 B2
Carlson  (45) Date of Patent: Dec. 18, 2012

(54) DEVICE AND METHOD FOR LURING AQUATIC ANIMALS

(75) Inventor: John H. Carlson, Middleborough, MA (US)

(73) Assignee: John H. Carlson, Middleborough, MA (US)

( * ) Notice: Subject to any disclaimer, the term of this patent is extended or adjusted under 35 U.S.C. 154(b) by 478 days.

(21) Appl. No.: 12/614,050

(22) Filed: Nov. 6, 2009

(65) Prior Publication Data

US 2010/0115821 A1  May 13, 2010

Related U.S. Application Data

(60) Provisional application No. 61/112,283, filed on Nov. 7, 2008.

(51) Int. Cl.
*A01K 91/00* (2006.01)
(52) U.S. Cl. ........................ 43/43.13; 43/42.22
(58) Field of Classification Search ................. 43/43.13, 43/43.14, 42.22
See application file for complete search history.

(56) References Cited

U.S. PATENT DOCUMENTS

| | | | | |
|---|---|---|---|---|
| 810,017 A * | 1/1906 | Ackerman | ................... | 43/42.09 |
| 2,167,335 A * | 7/1939 | Hayes | ........................... | 43/42.06 |
| 2,190,449 A * | 2/1940 | Goldammer | ................. | 43/42.04 |
| 2,461,833 A * | 2/1949 | Mercier | ........................ | 43/42.74 |
| 2,750,701 A * | 6/1956 | Beames | ........................ | 43/42.09 |
| 2,958,153 A * | 11/1960 | Yerman et al. | ................. | 43/43.14 |
| 2,986,838 A * | 6/1961 | Smyser | ........................ | 43/42.36 |
| 3,012,358 A * | 12/1961 | Multanen | ..................... | 43/42.28 |
| 3,077,047 A * | 2/1963 | Borgstrom | ................... | 43/42.17 |
| 3,367,057 A * | 2/1968 | Pond | ............................. | 43/42.02 |
| 3,898,758 A * | 8/1975 | Swanningson | ............. | 43/42.48 |
| 4,016,671 A * | 4/1977 | Larsen | ......................... | 43/42.17 |
| 4,038,774 A * | 8/1977 | Misiak | ......................... | 43/42.09 |
| 4,858,370 A * | 8/1989 | Ryder | .......................... | 43/43.13 |
| 5,090,151 A * | 2/1992 | Salminen | ..................... | 43/42.05 |
| 5,329,721 A * | 7/1994 | Smith | .......................... | 43/42.22 |
| 5,428,917 A * | 7/1995 | Cunningham | ............... | 43/42.21 |
| 5,987,805 A * | 11/1999 | Laney | .......................... | 43/42.13 |
| 6,058,645 A * | 5/2000 | Lummis | ....................... | 43/42.33 |
| 6,101,758 A * | 8/2000 | Finley | .......................... | 43/42.22 |
| 7,757,425 B2* | 7/2010 | Herasymchuk | .............. | 43/42.23 |
| 2001/0032412 A1* | 10/2001 | Laney | .......................... | 43/43.13 |
| 2011/0010983 A1* | 1/2011 | Briccetti et al. | ............... | 43/17.6 |

* cited by examiner

*Primary Examiner* — Christopher P Ellis
(74) *Attorney, Agent, or Firm* — Sonia K. Guterman; Lawson & Weitzen, LLP

(57) ABSTRACT

Devices, methods of manufacture, kits and methods of use for attracting aquatic animals to be caught are provided. In various embodiments the device includes a body, with an interior bar extending lengthwise in a channel in the body, an anterior loop and exterior loop on the anterior end and posterior ends of the bar respectively, a plate set into a transverse dorsal exterior slot in the body, and a weight in an interior chamber. The anterior loop of the device is attached to a vessel and the posterior loop is attached to one or more lures for hooking aquatic animals. In various embodiments the device is manufactured and/or painted to resemble a bait fish.

15 Claims, 2 Drawing Sheets

DEVICE AND METHOD FOR LURING AQUATIC ANIMALS

RELATED APPLICATION

This application claims the benefit of U.S. provisional application 61/112,283 filed in the U.S. Patent and Trademark Office Nov. 7, 2008, entitled "Method and Device for Luring Aquatic Animals", inventor John H. Carlson, which is hereby incorporated by reference in its entirety.

TECHNICAL FIELD

The technical field of the invention relates to devices towed by moving vessels for attracting fish and other aquatic animals.

BACKGROUND

Fishing equipment dates to prehistory. Fishermen have used lures throughout history to draw various types of fish to bite a hook, into a net or merely into close enough proximity so that the fish can see a second lure or baited hook, be speared or gigged with a hook. Inuit peoples in the arctic jig lines with bones to draw curious fish close enough to be speared or hooked. Fishermen on the Amazon River imitate the sound of fruit dropping into the flooded river to lure fish to baited hooks. Thus, the type of lure and the technique for using it varies with the type of fish or aquatic animal to be caught.

Tuna fish, a high value food fish, for example are commonly known to bite the last lure in a string of lures, therefore a tuna fishing lure rig may have only one lure that includes a hook. For example, a tuna fishing rig might include a first lure trailing a bar which in turn trails an inverted pyramidal arrangement of lures intended to resemble a school of fish with only the last lure at the tip of the inverted pyramid having a hook. Thus, a tuna fishing rig commonly includes a primary lure to which other lures are attached. This primary lure is commonly referred to as a "bird" or a "bird teaser" when it is designed to serve as an attractant through color, movement, sound or a combination thereof. There is a need for birds and teasers having greater strength and durability.

SUMMARY

An embodiment of the invention herein provides a device for attracting aquatic animals to a moving vessel including a body manufactured to have an animal morphology, the body having a length, a width, and a height; an interior bar extending lengthwise through the body, a plate set into a transverse dorsal exterior slot of the device at an angle to a plane of a dorsal surface of the device; loop attached to the bar, such that the anterior loop is positioned to attach to the moving vessel and the posterior loop is positioned to attach to one or more lures for attracting and hooking the aquatic animals. The anterior loop is attached to the anterior end of the body of the device, and the posterior loop is attached to the posterior to the body.

In related embodiments, the body includes at least a first and a second molded lateral section that are interlockably assembled with the bar interior to the lateral sections such that the lateral sections are attached to each other to form the body. For example, the lateral sections are a left lateral section and a right lateral section. Alternatively, the two molded sections are a top section and a bottom section, for example, a dorsal section and a ventral section.

In various embodiments the device further includes a capped hole on each of the first and the second lateral sections, such that the hole on the first lateral surface is located in a position corresponding to that on the second section. In general, a bait bar is placed through the hole on each lateral section when the molded lateral sections are interlockably assembled to faun the body.

In various embodiments the device further includes a weight positioned in an interior ventral chamber. In various related embodiments, the weight is located in an interior ventral chamber that is anterior, or is posterior, or is central with respect to the length.

In various embodiments the weight has a mass of about 1 gram to about 520 grams. For example, the mass is about 1 gram to about 50 grams; or the mass is about 100 grams to about 300 grams; or the mass is about 300 grams to about 520 grams. In general, the mass of the weight is proportional to the overall size of the device.

Accordingly, in various embodiments the length of the device is selected from the group of: about 5 inches to about 10 inches; about 10 inches to about 15 inches; and about 15 inches to about 30 inches. Shorter or longer devices are chosen to attract smaller or larger aquatic animals, respectively. Larger fish include such species as blue fin tuna and blue marlin. In related embodiments the aquatic animals include cordates that are not fish, such as sharks and rays, or various mammals or reptiles, and the device is designed to attract these animals In related embodiments of the device, the angle of the plate with the plane of the dorsal surface is about 5 degrees to about 90 degrees such that the plate forms an acute angle or a right angle with the anterior of the device. In general, the plate fits in the transverse dorsal exterior slot of the device and is planar, flat or linear in section throughout. It is envisioned that the bar in various embodiments is rectangular, however the shape can be oval, ovoid, circular, or have trapezoidal arms. Further the bar need not be planar throughout, and may have areas extending forward, backward or arching upward.

In general, the plate is located at a position of from about one third to about two thirds of the length from the anterior of the device. In various embodiments, the plate is located at a distance anterior to the maximal height of the device. In general the plate, located in a slot near the anterior of the device forms an angle between the plate that produces an upward force to the device, i.e., lift, as the device is impelled through the water. Alternatively the plate has curved or circular edges.

In various embodiments, the bar includes at least one material selected from the group of: nickel, brass, bronze, aluminum, acrylic, stainless steel, carbon fiber, titanium, and nickel-plated material. For example, the bar is a metal or polymer. In general the bar is corrosion resistant.

In various embodiments, the body of the device includes at least one material selected from the group of: acrylonitrile butadiene styrene (ABS), fiberglass, polyethylene, polyvinyl chloride, nickel, brass, bronze, aluminum, acrylic, stainless steel, carbon fiber, titanium, and nickel-plated material. In related embodiments, the body is substantially hollow. For example, the interior further includes molded ribs that function to maintain the position of the bar and support the structure of the molded lateral sections.

In various embodiments width of the device is about one-fiftieth to about one-fifth of the length of the device. In various embodiments, the height of the device is about one-twelfth to about one-third of the length of the device.

In various embodiments, the device further includes an artificial eye on each lateral section, such that the eye is positioned between about one-tenth to about one-third of the length from the anterior end of the device. In related embodiments of the device, the artificial eye includes a centrally located black opaque portion within a clear outer yellow portion. In general, an artificial eye is affixed or attached to each of two lateral sections, i.e., to each of the first lateral and the second lateral sections, the eye protruding from the surface of the lateral section. Each eye has a particular fish eye-like inner black "pupil".

Another embodiment of the invention herein provides a method of manufacture of a device for attracting aquatic animals, the method including the steps of molding interlocking plastic lateral sections of the device, such that the lateral sections form a body having an animal morphology; locating a bar substantially within an interior of the body, such that the bar comprises terminal loops that extend or protrude beyond the interior of the body; placing a weight in the interior; and securing the lateral sections together to form the body such that the bar and the weight are within the body. In various embodiments the body is secured using at least one selected from the group of: an adhesive, a clip, a screw, a nail, a fastener, a band, a snap, a strap, a tack, a tie, a buckle, a clamp, a clasp, a flange, a grommet, a peg, and a pin.

In related embodiments the method further includes: securing the lateral sections by gluing; filling a resulting seam with at least one selected from: epoxy, adhesive and fairing compound; and sanding the seam to obtain a smooth surface. In general, the device has an interior that is not open to the freshwater or saltwater environment to which the exterior surface of the device is subjected.

In another related embodiment the method further includes locating shaped plugs on lateral surfaces of at least a first and a second lateral section, such that the holes in the first and second lateral surfaces correspond, i.e., are located oppositely to each other, and are therefore position to receive a bait bar, the method further including prior to using, removing the plugs and inserting the bait bar extending perpendicularly through the width of the body. Alternatively the plugs are mushroom shaped, flat topped, hexagonal or tubular for ease of removal. Alternatively synthetic lures and natural attractants and/or attractant materials including larvae, crustaceans, aquatic animals, grains, vegetables are in various embodiments attached to the bait bar or are inserted into the holes to further attract aquatic animals.

In another related embodiment the method further includes painting the device.

In another related embodiment, the body includes a first and a second lateral section, and the method further includes inserting an artificial eye or attaching the eye to on an anterior end of the lateral sections. In various embodiments, the lateral sections further include a dorsal slot perpendicular or oblique to an axis of the length, the method including placing a plate in the slot and securing the plate. The plate functions as a set of wings or lateral fins, and causes lifting and fluttering as the device is towed.

In another embodiment, securing the plate further includes contacting the plate with at least one of water proof adhesive and at least one screw. For example, securing the plate involves both at least one screw and the waterproof adhesive. In general, securing the plate with screws and waterproof adhesive maintains the plate in position and prevents slipping or shifting of the position of the plate in the transverse dorsal slot or groove.

An alternative embodiment of the method, the method further includes interlocking the plate to the lateral sections with a ridge perpendicular to the plane of the slot. The ridge has a corresponding groove in the lateral section or sections securing the plate location. In various embodiments the plate is secured using at least one selected from the group of an adhesive, a clip, a screw, a nail, a fastener, a band, a snap, a strap, a tack, a tie, a buckle, a clamp, a clasp, a flange, a grommet, a peg, and a pin.

Another embodiment of the invention provided herein is a kit for a lure for catching or attracting an aquatic animal, the kit including any of the embodiments described above and at least one hook, lure or artificial bait, and a container. In various embodiments of the kit, the kit includes a bait bar. In yet further embodiments, the kit further includes a bait bar attached to at least one selected from the group of: a hook, a lure and an artificial bait.

Another embodiment of the invention provided herein is a method for attracting aquatic animals including the steps of: attaching a bait species shaped device to the stem of a boat, such that the device is a body with two interlocking lateral sections that has a corrosion resistant bar contained within a channel through the interior of the body; attaching at least one lure, the lure having at least one hook to an end of the device distal to the boat; and, towing the device behind the boat, wherein the device oscillates vertically at the surface of the water causing splashing similar to a wounded bait animal. For example, the splashing similar to a wounded bait fish attracts predatory animals. The bar extends beyond and protrudes from the body of the device.

BRIEF DESCRIPTION OF THE DRAWINGS

FIG. 1 panel A shows a lateral view of the device 100 with a plug 101 that occupies and locates a bait bar hole, an artificial eye 102 and an oblong plate 103 inserted into a groove in the dorsal surface. The device includes an anterior loop 104 and a posterior loop 105, both of which are attached to bar extending lengthwise through the interior of the body of the device.

FIG. 1 panel B shows a dorsal view of the device with the plug 101 in the bait bar hole, the eye 102 and the plate 103. The anterior loop 104 and the posterior loop 105 are attached to an interior bar extending lengthwise through the body of the device.

DETAILED DESCRIPTION

Figure 1A:
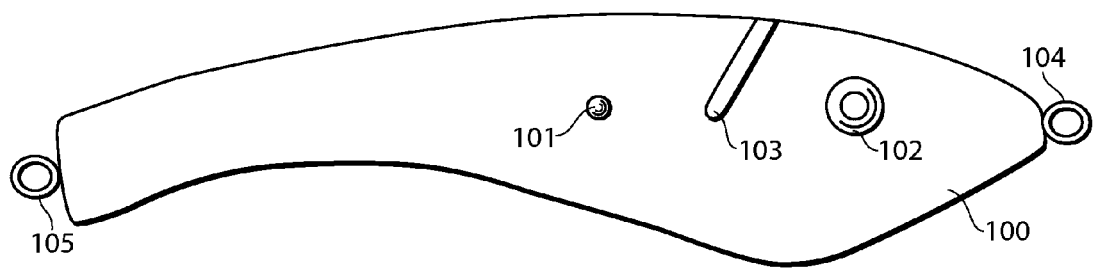
FIG. 1 is a drawing that shows two views of an embodiment of the device 100 in an assembled state.

Devices and methods are provided herein for attracting aquatic animals, the device having a body having an animal morphology. In general, the animal morphology is designed to simulate that of a bait animal, species or fish to attract aquatic animals. For example, in several embodiments the device is manufactured to resemble well-known freshwater and/or saltwater bait fish, e.g., mackerel, dorado, eels, silver perch, fathead minnows, rosey red minnow, redtail chub, shad, spanish sardine, atlantic croaker, herring, ballyhoo, blue runner, cigar minnow, glass minnow, ladyfish, menhaden, pigfish, sand perch, scaled sardine, silver trout, spotfish, spot tail pinfish, striped mojarra, striped mullet, etc. Bait fish attract aquatic animals based on the predatory instincts of the aquatic animals and the device herein can have an animal morphology any family of fish, for example, the device herein can be have the morphology of any common fish, or an unusual morphology such as that of pleuronectiformes (literally "side-swimmers") like flounder, halibut, and turbot, asymmetrical bilaterally with both eyes on one side in adults, whereas common fish and vertebrate are bilaterally symmetrical. An animal morphology that can attracts aquatic animals is considered within the scope of the invention herein.

An aquatic animal is a vertebrate or invertebrate animal that is found in fresh or salt water (e.g., lakes, oceans, ponds, seas, rivers, etc.), breathes air or extracts oxygen dissolved in water through specialized organs, or directly through its skin, and is attracted to a device having an animal morphology. Aquatic animals include those that live in aquatic environments or live both in water and on land (i.e., reptiles and amphibians). In general, aquatic animals described herein are fish, ectothermic animals covered with scales and equipped with fins.

In general the device provided herein has morphology of a fish, which one skilled in the art of animal morphology can conveniently describe using terms for anatomical characteristics of fish, (e.g., dorsal (top), ventral (bottom), lateral (sides), exterior, interior, etc.). Common anatomical and descriptive terms are well known to one of ordinary skill in the art. For example, the term "dorsal" is used herein to describe the uppermost surface of the device, "ventral" is used to describe the lowermost surface of the devices, and "lateral" is used to describe the sides of the device.

Accordingly, the term "lateral sections" as used herein refers to side sections, pieces, segments, or parts of the device. In many of the embodiments herein the device has two lateral sections that have a variety of projections and depressions such that when the two lateral sections are combined or fitted together, the device is secured into a unitary body. In an alternative embodiment, the device has a dorsal (top) section and a ventral (bottom) section. The sections of the device herein that form the body can also be described as halves, shells, sections, pieces, segments, parts, etc.

Figure 1B:
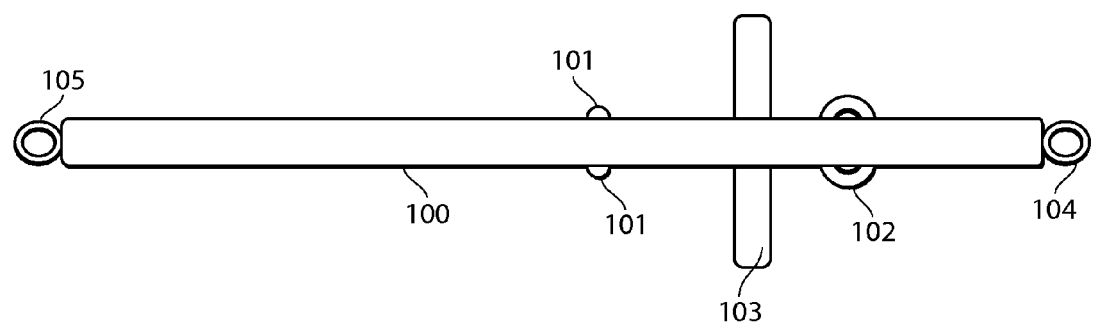

FIG. 1 panel A shows a lateral view of an embodiment of the device 100. In FIG. 1 panel A a simulated or artificial eye 102 is located at a position on a lateral surface about one-fifth of the length of the device from the anterior, or nose, of the device. For example, the eye 102 is located on each lateral surface at a position between about one-tenth to about one-third of the device length from the anterior. Each eye includes a pattern having a central black hemisphere within a clear outer hemisphere, such that the clear hemisphere has a yellow base. The artificial eye is attached to and protrudes from the lateral surface of the body. Certain embodiments include an eye with a moving pupil. The eye is manufactured or is commercially available. In alternative embodiments the eye is painted onto the lateral surface of the device or molded and painted, welded, fastened, attached, pushed or glued into place on the lateral surfaces of the device. The artificial eye 102 in one embodiment is hemispherical in shape, with the flat portion adjacent to and affixed on the lateral side of the device. The artificial eye is colored and shaped to appear as, mimic, or reproduce a bait fish eye to attract aquatic animals.

FIG. 1 panel A further shows a capped plug 101 for filling a bait bar hole visible near the center of the lateral surface. An oblong plate 103 is fixed in a groove in the dorsal surface, for example, by a screw, screws, a nail, or nails. FIG. 1 shows an anterior loop 104 and posterior loop 105 that are affixed to, or are part of, or are manufactured from the bar, and that protrude from the device for attaching lures to the posterior end of the device and attaching the device using the anterior loop to a vessel or fishing line. The anterior loop and posterior loop, 104 and 105 respectively, are attached to each end of an interior bar extending lengthwise through the device. A weight is located in a ventral chamber in the interior of the device. The weight functions to position the device in the water, so that it does not invert during use.

An embodiment of the invention provides a method in which the device is pulled behind or beside a vessel through the water. As the device moves through the water, the force of the water exerts pressure against the underside of the plate 103 set in the dorsal exterior of body of the device, thus lifting the device up to the surface of the water. As the device breaks the surface of the water the pressure on the bottom of the plate 103 decreases and gravity pulls the device down into the water again, and the force of the water against the bottom of the plate again lifts the device out of the water, thus repeating the cycle of fluttering. The force of the water on the plate is dependent on a number of variables and/or characteristics including, the angle, curvature and size of the plate (e.g., length, width, height etc.), the speed of the vessel pulling the device, the speed and direction of the water current, etc. FIG. 1 panel B shows a dorsal view of the device, in which the plate is usually in a position that forms an angle relative to the plane of the dorsal surface. The force of the water hitting the plate in this orientation imparts upward force or lift to the device. Thus the plate functions to lift the device due to the properties that it imparts to the motion of the device.

The cycle of rising in and out of the water creates a visual display and a splashing sound that imitates the sounds of wounded bait fish and bait fish fleeing predators. By this method the device lures or attracts aquatic animals either due to a predatory response or an instinct to amass or enter into a group, for example tuna may be attracted to a device having a mackerel morphology such that the tuna is attracted to and nears the location (above, at, and below the surface of the water) of the device surface. Alternatively mackerel can be attracted to a device having a mackerel morphology because the mackerel has an instinct to group itself with other mackerel. In various embodiments, the device herein having an animal morphology attracts the aquatic animal to a position and then strikes (i.e., is hooked) by one or more lures carrying hooks that are attached to and perpendicular or behind the device. The lures with hooks attached to the bait bar, or the posteriorly-positioned loop.

The plate 103 is set into the transverse groove in the dorsal surface of the device at an angle relative to the plane of the dorsal surface of the device, the angle being a right angle (90 degrees) or an oblique angle in a range of less than about 90 degrees to about 5 degrees as shown in FIG. 1 panel A. The plate mimics the pectoral fins of bait fish, such that an aquatic animal is attracted to the device. FIG. 1 panels A and B show the plate 103 set at about a 45 degree angle relative to the plane of the dorsal surface. The angle of the plate 103 influences the splashing action of the device as it is pulled through the water. In embodiments in which a more gentle splashing action is desirable, an angle of less than about 45 degrees to the plane of the dorsal surface is used. In embodiments where a more vigorous splashing action is desirable, an angle greater than about 45 degrees is used. The plate described herein has a length, width, and height. In general, the plate has a rectangular shape. In various embodiments the plate has a length from about 3 inches to about 20 inches, for example the plate has a length selected from the group of about 3 inches to about 5 inches, about 5 inches to about 8 inches, about 8 inches to about 15 inches, and about 15 inches to about 30 inches. In various embodiments the plate has a height of about 0.5 inches to about 8 inches, for example the plate has a length selected from the group of about 0.5 inches to about 2 inches, about 2 inches to about 6 inches, and about 6 inches to about 8. In various embodiments the plate has a width of about 0.1 inches to about 3 inches, for example the plate has a length selected from the group of about 0.1 inches to about 0.5 inches, about 0.5 inches to about 1 inch, about 1 inch to about 2 inches, and about 2 inches to about 3 inches.

The plate 103 fits into the transverse dorsal exterior slot or groove of the device is in various embodiments herein planar (flat or linear) across its length. The plate in various embodiments is rectangular, or is curved or has a circular shape such that plate appears as an oval or another partially spherical shape. Various shapes of plates are contemplated so that the device has a more realistic animal morphology. In various embodiments, the plate has a planar portion that is fitted into the slot, the fins making a fixed angle with the plane of the portion fitted into the slot. As the plate fin portion extends outward from that area fitting into the transverse dorsal slot, from the body of the device, the plate in various embodiments is bent or has a twist. Thus, the ability of the water to exert force on the plate, which creates an angle across its length with the plane of the dorsal surface, and create an upward force (i.e., lift) is achieved with alternative embodiments of the shape of the plate.

With reference to FIG. 1 panel B, an embodiment of the device includes a capped hole 101, or opening of discrete size and location on each lateral surface. A hole on each lateral section is located in a position corresponding to a location of a hole on the other lateral section. The capped holes 101 are openings that when connected, the connection forms a line that is approximately perpendicular to a lateral plane of the device. These locations facilitate installation of a bait bar on the device. FIG. 1 panel B shows for example a cap that is mushroom shaped, 101 that covers an opening for a bait bar.

A "bait bar" as used herein is a rod of stainless steel, titanium, aluminum another metal or composite construction to which strings of lures are attached, so that the lures are towed. If a plurality of strings is attached, then the lures are towed side by side attached to the same device. The bait bar is inserted into the device so that the bar extends or protrudes at approximately equal lengths from each lateral side of the device and lies in a plane approximately parallel to a plane of the lateral surface of the device. Alternatively, attractants and/or attractant materials include food source materials (e.g., larvae, crustaceans, aquatic animals, grains, and vegetables) are inserted into the holes to further attract aquatic animals. Without being limited to any particular embodiment, these attractants and/or attractant materials include clams, ground fish, bread, grubs, crab, corn, fish eggs, worms, shrimp, flies, etc. These attractants and/or attractant materials inserted into the holes in the lateral surfaces of the device body can be in frozen or liquid form (e.g., packets, devices, cubes, bars, etc.). Alternatively the attractants and/or attractant materials are synthetic materials having a shape, size, color, and even sound that would attract aquatic animals, for example brightly colored sound producing plugs, lures, or covers for the holes in the lateral surfaces of the device.

In various embodiments the device has a length selected from the group of about 5 inches to about 10 inches, about 10 inches to about 15 inches, and about 15 inches to about 30 inches. An embodiment of the device is about 12 inches long, however this length is exemplary and the invention is not limited by any particular length. The size of the device is selected by the user to be appropriate to the size of the species it is intended to attract. If the device is deployed to attract a smaller species such as a yellowtail tuna the appropriate size of the device in an embodiment is 5 to 10 inches. If the device is deployed to attract a species such as a blue fin tuna fish, which can weigh hundreds of pounds, the appropriate length of an embodiment of the device is 10 or more inches. Similarly, a lure for a great white shark can have a length of at least about 30 inches. Thus, the size of the device can be designed and customized for the specific aquatic animal that is to be attracted, and is influenced by variables including: type of fishing (saltwater or freshwater), type and size of aquatic animal found in different types of locations (shoreline, deep sea, etc.), type and size of fish that bait fish which the specific aquatic animal is known to prey upon, etc.

The device has a width of about one-fiftieth to about one-fifth of its length. The device is designed to mimic animal morphology, for example, an embodiment for mimicking a mackerel has a width of about one-tenth to one-fifteenth of its length. Certain embodiments of the device have a height in the range of about one-twelfth to one-third of its length. An embodiment of the device designed for mimicking a menhaden has a height of about one-third of the device length. An embodiment designed for mimicking a mackerel has a height of about one-sixth of the device length. Thus, the width of the device is designed and customized to attract specific aquatic animals and depends on variables including, for example, the type of fishing being undertaken (i.e., freshwater or saltwater), the type and size of aquatic animal being sought, etc.

Previous fishing lures (e.g. birds, teaser birds, etc.) include an external weight, are wooden construction, and have two monofilament lines looped through a hole in both the anterior and posterior portions of the device, respectively. The monofilament loops connected each of the anterior of the device to the stern or outrigger of a moving vessel, and the posterior of the device to lures and hooks, to trail behind the device. To prevent loss of the device in a case where the monofilament loops chafe through or part under the sudden load of a fish strike, the loops were swaged to a monofilament line running the length of the device. This monofilament line transfers the force of a fish or other animal strike on lures trailing behind the device directly to the fishing pole or other point of attachment on the vessel towing the device. Direct hits (i.e., an aquatic animal contacting a fishing lure and/or bird) cause frequent breaking of the monofilament loops on the device. The loss of the lure and the device results in a lost opportunity for a fisherman to enjoy catching the fish along with financial loss of lost equipment, and in the case of high value fish such as tuna, financial loss of the fish.

Prior art bird teaser lures, for example, are manufactured of wood in a manual process. A lead weight is attached to the exterior of the lure body. The construction of the prior art wooden lure is laborious and time consuming and limits the commercial potential of that product. The external location of the weight subjects the device to damage and loss. The weight also forms a bulge on the silhouette of the device, thus reducing both the streamlining and the realism of the animal mimicry of the device. Even if not lost the prior art bird teaser lures are less likely to attract an aquatic animal because of lack of appropriate realism of the bait fish.

In contrast to the monofilament lives, the devices provided herein feature a bar interior to the device, with loops, for example a bar that is corrosion resistant, located in the interior of the device with the loops at ends protruding from both the anterior and posterior of the device. The bar transfers the force or load that an aquatic animal imparts during a strike directly from the device to the fishing line or cable attaching the device to the stern of the vessel. In an embodiment of the invention a corrosion resistant bar fits in channels of the lateral section interior, and bends if present in the bar correspond to bends that are manufactured in each lateral section, or half, of the device. The bends in the channel and in the bar greatly increase resistance of the bar to motion forward and backwards in the channel, thereby decreasing wear and tear on the device due to use. Loops, for example welded loops, at each end of the bar protrude from the device (see FIG. 1 panels A and B) so that towing lines and other fishing gear are readily attached to the device by the loops on the bar.

Figure 2:
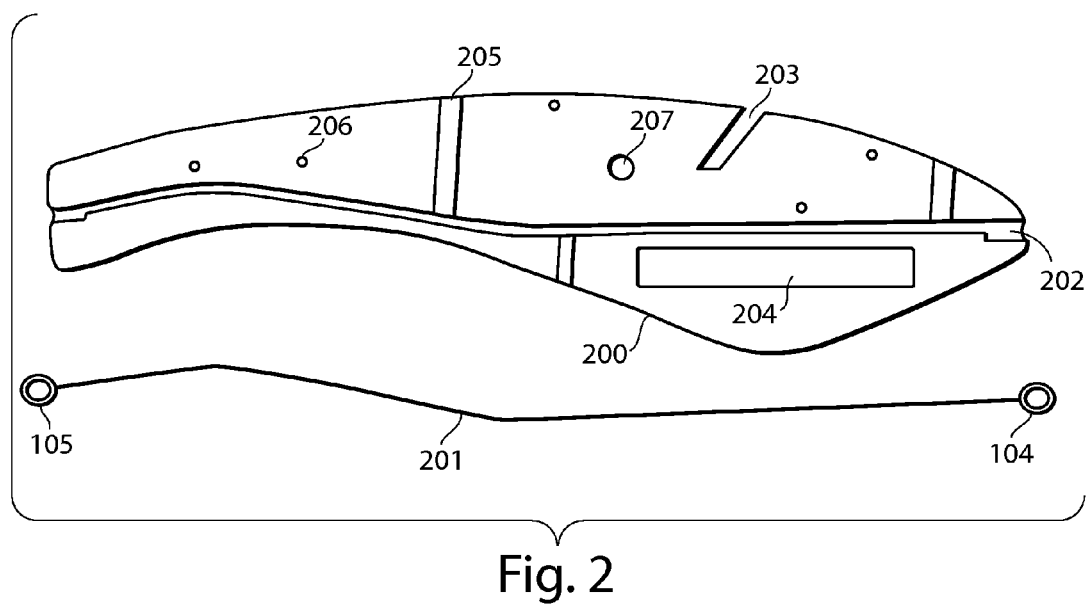
FIG. 2 is a drawing that shows an embodiment of the device having a molded lateral section 200 in a preassembly state with the bar 201 with the anterior loop 104 and the posterior loop 105 shown below the lateral section. The lateral section has been molded to have channel 202 that extends lengthwise through the entire body. A transverse dorsal exterior slot or groove 203 has been molded, into which a plate is inserted at an angle to a plane of the dorsal surface of the device. A ventral chamber 204 on the lateral section is molded to hold a weight to be located within the device. The lateral section of the device includes molded ribs 205 that maintain the bar in position and support the structure of the lateral section when combined to other lateral sections to form the body. Male and female member locks 206, i.e., snaps, are used to affix or bind the lateral sections together to form the device. The lateral sections of the device included a number of molded ribs that support the structure of the lateral sections. Also shown is a hole or opening 207 in the lateral section through which a bait bar can be inserted.

With reference to FIG. 2, a molded lateral section of an embodiment of the device in a preassembly state, includes the channel for the bar 201 with loops which is shown below the lateral section. Male and female interlocking members 206, i.e., snaps, are visible on the lateral section respectively, as is the longitudinal channel 202 located centrally on the lateral section. A hole 207 or opening for a bait bar is located near the center of the lateral section. A slot or groove 203 is molded in the dorsal surface of the lateral sections for receiving a plate 103, and ribs 205 are molded on the interior of the substantially hollow lateral sections of the device. Along the longitudinal channel that holds the bar, ribs are molded to extend from the interior surface of the lateral sections. These ribs maintain the bar within the channel and impart additional structural strength to the lateral sections and the body.

To assembled the device, the male and female members 206 lock together when the lateral sections are juxtaposed, enclosing the shaft of the bar 201 in the longitudinal channel 202 and enclosing a weight in an interior ventral chamber 204. Thus, as assembled as shown in FIG. 1, the device having a lateral section shown in FIG. 2 includes a bar 201 contained within the channel 202 extending through the interior of body, the loops at the bar termini extending beyond each of anterior and posterior ends of the body (i.e., anterior loop and posterior loop, 104 and 105 respectively).

The bar termini include, for example, loops formed by bending the bar, further having ends welded to and along a portion of each end of the bar. The loops are formed by bending the bar at each of the termini and joining the bent portion to the bar by welding.

Alternatively the bar and loops are formed by molding of molten corrosion-resistant metal or alloy. The device further includes a plate 103 set into a transverse dorsal slot or groove in the device at a right angle or an oblique angle, the angle formed by the plate and relative to a plane of the dorsal surface of the device.

In various embodiments, manufacture of the corrosion resistant bar with welded loops in its termini uses an unformed corrosion resistant bar, a bending mandrel and bending members. The bending member is moved into contact with the bar and pressed against the bending mandrel. The bending member forces the bar against the mandrel in coordination with the bending member so that a curve is formed in the rod which conforms to the exterior radius of the bending mandrel. The bending member moves in a semicircle to bend the rod around the mandrel and back upon itself thus completing the forming of the loop in the terminus of the bar. The looped terminus of the bar includes a linear portion that is welded to the length of the bar by positive and negative current applied to sections of the bar in contact with bending members.

In various embodiments the corrosion resistant bar includes at least one material selected from the group of: nickel, brass, bronze, aluminum, acrylic, stainless steel, carbon fiber, titanium, and nickel-plated material. Corrosion resistance is confer longer useful life to the bar, which is subjected to immersion in salt water. Trapped pockets of salt water cause corrosion prone materials to fail in salt water environments.

In alternative embodiments, loops attached to the posterior and anterior ends of a bar by twisting, sliding or fastening additional material to the bar, after which the loops are welded in position. Loops of particular material and design are chosen, attached and welded to the bar. The bar with attached and welded loop is placed within the channel 202 interior to a lateral section that extends lengthwise through the lateral section of the body. A weight is placed in a ventral chamber 204 of the body. The lateral section is secured together to another lateral section using male and female member locks (i.e., snaps, having projections and depressions) to form the body of the device.

In general, the bar having anterior and posterior loops and extending lengthwise within the interior of the device is made of a metal or polymer having high tensile strength. The bar has high tensile or structural strength and is resistant to corrosion from the freshwater or saltwater environment in which the device is placed.

The device in various embodiments provided herein has a weight contained within a shell of a body. Enclosing of the weight within the body streamlines the device and hides the weight, thus increasing the realism of the device as a mimic of a fish. The internal location of weight produces much less damage or loss than an external location of a weight. Loss of the internal weight would require substantial damage to the body of the device.

The weight in various embodiments has a mass in the range of about 1 gram to about 520 grams. For example, the mass is about 1 gram to about 50 grams; or the mass is about 100 grams to about 300 grams; or the mass is about 300 grams to about 520 grams. The weight in the body of the device has an extent of mass, and that mass is selected approximately in proportion to the size of the plate 103 and the overall size of the device, such that a larger device is manufactured to contain a weight with more mass to cause the device more into the water during use. Alternate embodiments include placing the weight in the head (anterior), in the abdomen or ventral area, in the tail, or posterior of the body.

The body of the device is manufactured, in various embodiments, from at least one material selected from the group of acrylonitrile butadiene styrene (ABS), fiberglass, polyethylene, polyvinyl chloride, nickel, brass, bronze, aluminum, acrylic, stainless steel, carbon fiber, titanium, and nickel-plated material selected from the group. For example, in a device body embodiment shown in FIG. 2, the device body lateral sections are molded from ABS, are substantially hollow and the interiors of the lateral sections further include molded ribs 205. The ribs radiate outward from a raised ring surrounding a bait bar hole, and provide support for the structural stability of the device with the bait bar, and increase the overall rigidity of the body (FIG. 2). Alternatively, the body of the device is made without the molded ribs and having an animal morphology with sufficient structural stability with a rigid body to attract aquatic animals. The body of the device is manufactured in a selected color, size, and shape, and in addition the surface of the device is modified with additional characteristics designed onto the body surfaces, for example wrappings (e.g., iridescent, shimmering, striped, etc.), indentations (e.g., in the anterior ventral area to appear as a mouth, alongside the dorsal surface to appear as a dorsal fin and/or spines, etc.) or protrusions (e.g., ridges alongside the lateral sections to mimic gills, circular ridges to mimic fish scales, etc.).

An embodiment of a method of manufacture of the device provided herein includes the steps of: forming two interlocking lateral sections of the device from plastic, placing a bar having loops welded in either end in a channel in one lateral section of the device with adhesive, placing a weight in a chamber in one lateral section of the device, and gluing the two lateral sections together. In an embodiment the interlocking lateral sections have male and female pins and holes, such that one section of the body has pins that fit in the holes in the other lateral section. Adhesive is applied to the surfaces to be joined before assembly, creating a strong joint when the lateral sections are pressed together to form the device body. In general, the body of the device is manufactured to be waterproof, and is substantially free of seepage or leaks into the interior.

In related embodiments of the method, a seam formed by gluing the two lateral sections together is further filled with epoxy, adhesive or a fairing compound and the seam is sanded smooth to conform to the surrounding surface. Fairing compound for example is well-known as a material for smoothing surfaces and is commercially available from commercial suppliers such as 3M Inc., DAP Inc., and Bondo Inc. Plugs, for example mushroom shaped plugs, are placed in holes on each lateral section, the plugs being removable for optionally inserting a bait bar. The device is optionally painted. An eye is then inserted or painted on each side of the device and a rectangular plate is placed in a groove or slot in the top of the device and secured with waterproof adhesive, one or more screws, or both waterproof adhesive and screws. The screw, screws, nail, or nails used to secure the plate are selected from among suitable sizes and types. The screw or nail secures the plate by applying pressure on the plate through a hole located in the dorsal, ventral or lateral surface of the device, mounted at a suitable angle. In some embodiments the plate interlocks with a ridge running perpendicular to the plane of the groove. The plate accordingly has a notch on its underside that interlocks with a step in the middle of the groove, thus locking the plate in position laterally. In various embodiments the plate is locked into the transverse dorsal slot using other attachment methods including magnets, pins, fasteners, hooks, adhesives, clips, projections and depressions, for example male and female member locks. In various embodiments the plate is locked into the transverse dorsal slot using at least one selected from the group of: a screw, a nail, a band, a snap, a strap, a tack, a tie, a buckle, a clamp, a clasp, a flange, a grommet, and a peg.

An alternative embodiment of the method of manufacture includes assembling foam components with chambers (spaces or recesses) for the corrosion resistant bar and weight, by placing two pieces of foam together with the bar and the weight between them, and inserting the partly assembled foam device in a two part mold. The mold has a release agent on its surface upon which a layer of paint or gel coat is applied, followed by a layer of fiberglass, Dynel, Kevlar, Spectra or other composite material, permeated with resin such as polyester, vinylester or epoxy. The method of manufacture of the composite construction device further includes curing the device and removing it from the mold. Components such as eyes 102, bait bar hole plugs 101, and the rectangular plate 103 are added to the device after removing from the mold. This method of manufacture has the advantage of eliminating a separate painting step.

Another embodiment of the method of manufacture includes shaping a single piece of foam and then spin wrapping the device with fiberglass cord wetted out with polyester, vinylester or epoxy resin. This method includes coating the corrosion resistant rod with resin and inserting the coated bar into the shaped foam piece. The weight is into a recess in the anterior ventral area of the shaped foam. The method further includes holding the assembled foam, bar and weight components as an assembled unit and wrapping the unit with a fiberglass cord wetted with resin with a spool device. After wrapping the method further includes placing the partly assembled unit is placed in a mold with fairing compound and gelcoat or paint to cure. The mold creates the recesses for the features of the device such as eyes 102 and the bait bar hole 207 in the partly assembled unit.

Another embodiment of the method of manufacture includes constructing the device with two lateral sections having a division on a bias corresponding to and abutting the plane of the plate transecting the assembled device. The construction of the forward section of the device integrates the plate so that the posterior section of the device interlocks with the anterior section at the posterior surface of the plate. The method includes inserting a weight in a chamber in the ventral portion of the anterior section prior to assembling the lateral sections. Also prior to assembly, the method includes inserting a corrosion resistant bar with a loop welded in the posterior end in the posterior section of the device so that the anterior end of the bar extends beyond the posterior section. The method further includes bending the corrosion resistant rod at an angle and sliding the anterior section of the assembly over the rod. With the anterior portion securely in place, the method further includes bending the anterior end of the rod back upon itself to form the anterior loop, and welding the anterior loop to the bar. The two lateral sections in various embodiments are manufactured from plastic such as ABS plastic or fiberglass composite and the method includes holding the lateral sections and the corrosion resistant rod and weight in place with adhesive. The method further includes filling the seam between the two lateral sections with resin and adding additional components such as eyes 102 and bait bar hole filler caps 101 to the device and painting the device.

A further embodiment of the method of manufacture includes fashioning a foam core with an animal morphology and inserting a weight into a space in the anterior ventral portion of the foam core. The method further includes wetting a kevlar, spectra or other high strength cord with epoxy and forcing the cord through the foam core while the foam core is flexed to an approximately 25 degree bend. The method further includes returning the foam core to an non-flexed position and wrapping the ends of the kevlar or spectra cords back upon themselves to form terminal loops and securing them in that position until the resin cures. The flexing of the foam core during the process of forcing the cord through the core provides the channel containing the cord with a bend which, once the resin has cured, greatly enhances the resistance of the cord to forward and backward motion within the channel. The method includes dipping the device in a resin and fiber bath, withdrawing it and placing it in a mold containing male features corresponding to the depressions required for inserting the eyes 102, plate 103 and the bait bar hole plugs 101. The device remains in the mold for the duration of curing the resin. The method further includes taking the device from the mold, and inserting the eyes 102, and plate 103 in their respective recesses with adhesive, fitting the bait bar hole plugs 101 into their holes, and painting.

A further embodiment of the invention includes at least one device as described herein in a kit for a lure for catching or attracting an aquatic animal and further includes at least one hook, lure or artificial bait, and a container. A further embodiment of a kit includes a bait bar or a bait bar rigged with hooks, lures or artificial bait. In one such an embodiment the device is packaged in the container with the bait bar inserted in the device and lures attached to the bait bar so that a user simply removes the device and attached bait bar and lures from the package, attaches it to a line, puts the device in the water and is ready to fish.

The invention has been described above as to preferred embodiments. However, one skilled in the art will recognize that a multitude of materials, shapes and colors could be used to further embody the invention. Thus, although the preferred embodiments are described above the invention is intended to cover all modifications and equivalents within the scope of the claims.

What is claimed is:

1. A device for attracting aquatic animals to a moving vessel, the device comprising a body manufactured to have an animal morphology, the body having a length, a width, and a height; an interior bar extending lengthwise through the body, a plate set into a transverse dorsal exterior slot of the device at an angle to a plane of a dorsal surface of the device; and an anterior loop and a posterior loop each respectively attached to an anterior and a posterior end of the bar, wherein the anterior loop is positioned to attach to the moving vessel and the posterior loop is positioned to attach to one or more lures for attracting and hooking the aquatic animals.

2. The device according to claim 1 wherein the body comprises at least a first and a second molded lateral section, wherein the first and the second lateral sections are interlockably assembled, wherein the bar is positioned interior to the lateral sections and the lateral sections are attached to each other to form the body.

3. The device according to claim 2 further comprising a capped hole on each of the first and the second lateral sections, wherein the hole on the first lateral surface is located in a position corresponding to that on the second section.

4. The device according to claim 1 further comprising a weight positioned in an interior ventral chamber.

5. The device according to claim 4 wherein the weight comprises a mass selected from the group of: about 1 gram to about 50 grams; about 100 grams to about 300 grams; and about 300 grams to about 520 grams.

6. The device according to claim 1 wherein the length is selected from the group of: about 5 inches to about 10 inches; about 10 inches to about 15 inches; and about 15 inches to about 30 inches.

7. The device according to claim 1 wherein the angle of the plate with the plane of the dorsal surface is about 5 degrees to about 90 degrees wherein the plate forms an acute angle or a right angle with the anterior of the device.

8. The device according to claim 1 wherein the plate is located at a position of from about one third to about two thirds of the length from the anterior of the device.

9. The device according to claim 1 wherein the bar comprises at least one material selected from the group of: nickel, brass, bronze, aluminum, acrylic, stainless steel, carbon fiber, titanium, and nickel-plated material.

10. The device according to claim 1 wherein the body of the device comprises at least one material selected from the group of: acrylonitrile butadiene styrene (ABS), fiberglass, polyethylene, polyvinyl chloride, nickel, brass, bronze, aluminum, acrylic, stainless steel, carbon fiber, titanium, and nickel-plated material.

11. The device according to claim 2 wherein the body is substantially hollow and the interior further comprises molded ribs that maintain the bar position and support the structure of the molded lateral sections.

12. The device according to claim 1 wherein the device width comprises about one-fiftieth to about one-fifth of the length.

13. The device according to claim 1 further comprising an artificial eye on each lateral surface positioned between about one-tenth to about one-third of the length from the anterior of the device.

14. The device according to claim 1 wherein the device comprises a height of about one-twelfth to about one-third of the length.

15. The device according to claim 13 wherein the eye comprises a centrally located black opaque portion within a clear outer yellow portion.

* * * * *